United States Patent [19]

Miyachi et al.

[11] 4,450,457

[45] May 22, 1984

[54] LIQUID-JET RECORDING HEAD

[75] Inventors: Takeshi Miyachi, Yokohama; Hisanori Tsuda, Tokorozawa; Toshitami Hara, Tokyo; Yukio Kasugayama, Yokohama, all of Japan

[73] Assignee: Canon Kabushiki Kaisha, Tokyo, Japan

[21] Appl. No.: 409,504

[22] Filed: Aug. 19, 1982

[30] Foreign Application Priority Data

Aug. 24, 1981 [JP] Japan .............................. 56-132477

[51] Int. Cl.$^3$ .............................................. G01D 15/18

[52] U.S. Cl. .............................................. 346/140 R

[58] Field of Search .................................... 346/140 R

[56] References Cited

U.S. PATENT DOCUMENTS 4,334,234 6/1982 Shirato ............................ 346/140 R 4,335,389 6/1982 Shirato ............................ 346/140 R

*Primary Examiner*—Joseph W. Hartary

*Attorney, Agent, or Firm*—Fitzpatrick, Cella, Harper & Scinto

[57] ABSTRACT

A liquid-jet recording head provided with a liquid ejecting section comprising an orifice for ejecting a liquid to form its flying droplets and a liquid flow path communicating with the orifice and having as a portion of the constitution a heat action zone where thermal energy for forming said droplets acts on the liquid and with an electro-thermal transducer comprising at least one pair of opposing electrodes electrically connecting to a heat-generating resistance layer formed on a base plate and a heat generating part formed between the electrodes, characterized by having a protective layer composed of a first layer of an organic material and a second layer of an inorganic material which are laminated on the portion of the electrode under the liquid flow path in that order from the electrode side.

7 Claims, 7 Drawing Figures

LIQUID-JET RECORDING HEAD

BACKGROUND OF THE INVENTION

1. Field of the Invention

This invention relates to a liquid-jet recording head for ejecting a liquid to form flying droplets and perform recording therewith.

2. Description of the Prior Art

The ink-jet recording method (liquid-jet recording method) has become of interest in recent years in that it generates substantially no noise at the time of recording and it permits high-speed recording and yet effects such recording on plain paper without requiring any particular fixing treatment.

Of various types of liquid-jet recording systems, a certain type of the system disclosed, for example, in Japanese Patent Laid-Open No. 51837/1979 and German Patent Offen (DOLS) No. 2843064 has a characteristic distinguished from that of the other liquid-jet recording systems in that the driving force for discharging liquid droplets is obtained by exerting thermal energy to the liquid.

The characteristic of the systems disclosed in the above patent applications is that the liquid subjected to the thermal energy changes its state along with a rapid increase in its volume and is ejected from an orifice positioned in the front end of the recording head by the actuating force based on the state change to form flying droplets, which are allowed to adhere to recording paper or the like, thereby performing the recording.

In particular, the system disclosed in DOLS No. 2843064 is characterized by giving images with high degree of resolution and high quality at a high speed since this system can not only be effectively applied to the so-called drop-on demand recording method but also realize with ease a full-line type of recording head having a plurality of orifices densely arranged.

The recording head portion of an apparatus applied to the above liquid-jet recording system utilizing thermal energy is provided with a liquid ejecting section having an orifice for ejecting the liquid and a liquid flow path communicating with the orifice and comprising partly a heat action zone where thermal energy acts on the liquid to discharge it and an electro-thermal transducer as a means of generating thermal energy. This electro-thermal transducer is provided with a pair of electrodes and a heat-generating resistance layer which is connected to the electrodes and has a heat generating region (portion) between the electrodes.

A typical structure of such liquid-jet recording head is shown in FIGS. 1A and 1B.

FIG. 1A is a partial front view of a liquid-jet recording head according to the prior art seen from the orifice side. FIG. 1B is a partial cross sectional view taken on the dot-dash line X-Y in FIG. 1A.

The recording head 101 shown in these drawings has a structure wherein orifices 105 and liquid-ejecting sections 106 are formed by covering and bonding a base plate 103 having an electro-thermal transducer 102 on its surface with a grooved plate 104 which has a predetermined number of grooves with a predetermined width and depth at a predetermined line density. A recording head having a plurality of orifices 105 is shown in FIG. 1A. However, this invention is not limited only to such a head. A recording head having a single orifice is also included in the scope of this invention.

The liquid ejecting section 106 has at its front end an orifice 105 for ejecting the liquid and a heat action zone 107 where the thermal energy from the electro-thermal transducer 102 acts on the liquid to produce bubbles and cause an abrupt state change due to the expansion and contraction of the liquid volume.

The heat action zone 107 is positioned above a heat generating part 108 of the electro-thermal transducer 102 and its base is a heat action surface 109 of the heat-generating part 108 in contact with the liquid.

The heat generating part 108 is constructed with a lower layer 110 laid on the base plate 103, a heat-generating resistance layer 111 laid on said lower layer 110 and an upper layer 112 laid on said heat-generating resistance layer 111. Electrodes 113 and 114 are provided on the surface of the heat-generating resistance layer 111 for the purpose of allowing electric current to flow through the layer 111 for heat generation. The electrode 113 is common to all the heat generating parts of the liquid ejecting sections, while the electrodes 114 are selective electrodes formed along the liquid flow paths for the purpose of causing selectively the heat generation from the heat generating parts 108.

The upper layer 112 serves to protect the heat-generating resistance layers 111 chemically and physically from the liquid used. The layer 112 isolates the layer 111 from the liquid filling the liquid flow path in the liquid ejecting section 106 and at the same time prevents short circuit between electrodes 113 and 114 through the liquid.

Another important role of the upper layer 112 is to prevent the leakage of electric current between neighboring selective electrodes 114 or the galvanic corrosion that may occur if any of the electrodes is brought into contact with the liquid by some cause and electric current flow. Therefore, the upper layer 112 having such functions as a protecting layer is formed at least on the electrodes positioned under the liquid flow path.

While the liquid flow paths communicate with one another at the upstream region of the liquid ejecting sections through a common liquid chamber, the electrode connected with the electro-thermal transducer is formed so as to extend under said common liquid chamber at the upstream side of the heat action portion for convenience of design. Accordingly, also in this region, the above-mentioned upper layer 112 is generally formed for the purpose of preventing the contact of the electrodes with the liquid.

The properties required for the upper layer 112 vary depending upon the place where the layer 112 is formed. For instance, in the region of the heat generating portion 108, the layer 112 is required to be excellent in (1) heat resistance, (2) resistance to the liquid, (3) liquid-penetration preventing property, (4) heat conductivity, (5) oxidation preventing property, and (6) resistance to mechanical damage. In the regions other than the heat generating portion 108, such layer is required to have sufficiently excellent liquid-penetration preventing property, resistance to the liquid and resistance to mechanical damage though requirements for thermal properties become somewhat milder.

However, there is no material at present for the upper layer that sufficiently fulfills all the above requirements (1)-(6). Accordingly, in the existing circumstances, some of these requirements are loosened for practical application of the existing materials.

Thus, material for the upper layer 112 is selected in consideration preferentially of requirements (1), (4), and (5) in the region of the heat generating part 108. In the other regions, for example electrode portion, requirements (2), (3) and (6) are preferentially considered to select the material for the upper layer.

On the other hand, in the process for producing a multi-orifice type of liquid-jet recording head, formation and partial removal of the layers on a base plate are repeated for making a number of fine electro-thermal transducers on the base plate, and in the stage for making the upper layer, the surface to be covered with the upper layer becomes uneven to a small extent, that is, step edge portions (level differences) are produced on the surface, so that the adhesion, or step coverage property of the upper layer in these step edge portions becomes important. If the step coverage property in the step edges is poor, penetration of the liquid occurs in the stepped places and this causes galvanic corrosion or dielectric break down of the materials in this region.

When the probability of producing defective points in making the upper layer is not low, the liquid penetration will occur through the defective points. This is generally responsible for a remarkable decrease in the working life of the electro-thermal transducer.

In consequence, there is required a good step coverage property of the upper layer in the step edge portion and low probability of producing defects in the layer formed, such as pinholes. If defects are produced, they are required to be practically negligible.

However, there has not been proposed previously a liquid-jet recording head that fulfills all these requirements and is excellent in overall durability.

SUMMARY OF THE INVENTION

This invention has been accomplished in view of the foregoing respects.

Thus, it is the primary object of this invention to provide a liquid-jet recording head which is excellent in overall durability and can maintain its initial good characteristics for forming liquid droplets constantly over a long period of time.

Another object of this invention is to provide a liquid-jet recording head produced by a highly reliable fabrication process.

A further object of this invention is to provide a liquid-jet recording head producible in high yield even when the head is of a multi-orifice type.

According to the present invention, there is provided a liquid-jet recording head provided with a liquid ejecting section comprising an orifice for ejecting a liquid to form its flying droplets and a liquid flow path communicating with the orifice and having as a portion of the constitution a heat action zone where thermal energy for forming said droplets acts on the liquid and with an electro-thermal transducer comprising at least one pair of opposing electrodes electrically connecting to a heat-generating resistance layer formed on a base plate and a heat generating part formed between the electrodes, characterized by having a protective layer composed of a first layer of an organic material and a second layer of an inorganic material which are laminated on the portion of the electrode under the liquid flow path in that order from the electrode side.

BRIEF DESCRIPTION OF THE DRAWINGS

FIGS. 1A and 1B illustrate a typical example of the prior art recording head, wherein FIG. 1A is a partial front view thereof and FIG. 1B is a partial cross sectional view taken on the dot-dash line X–Y in FIG. 1A.

FIGS. 2A, 2B, 2C, and 2D illustrate a recording head of this invention, wherein FIG. 2A is a partial front view thereof, FIG. 2B is a partial cross sectional view taken on the dot-dash line A—A' in FIG. 2A, FIG. 2C is a partial plane view of a T/J base plate, and FIG. 2D is a partial cross sectional view taken on the dot-dash line B—B' in FIG. 2C.

DETAILED DESCRIPTION OF THE INVENTION

Figure 1A:
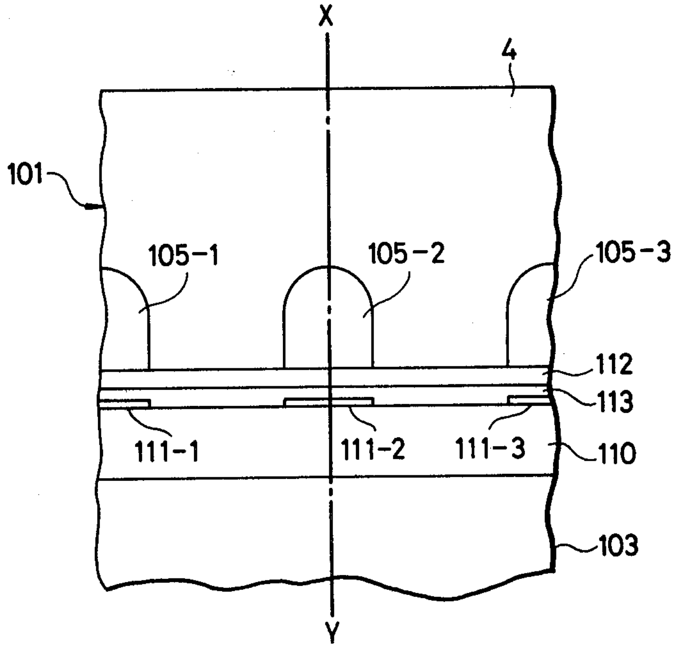
FIG. 1A PRIOR ART

Referring now to the drawings, this invention is described in detail.

Figure 1B:
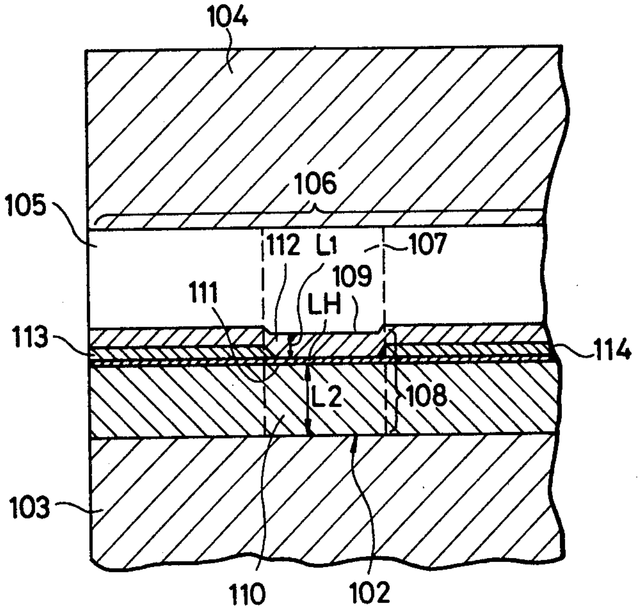
FIG. 1B PRIOR ART
Figure 2A:
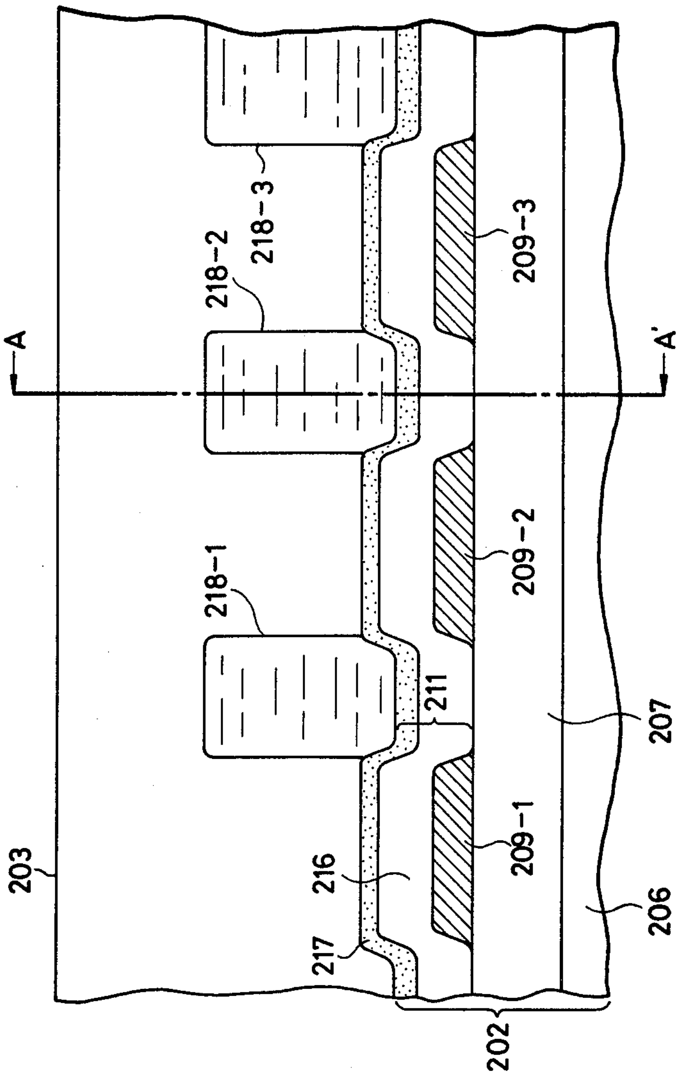
Figure 2B:
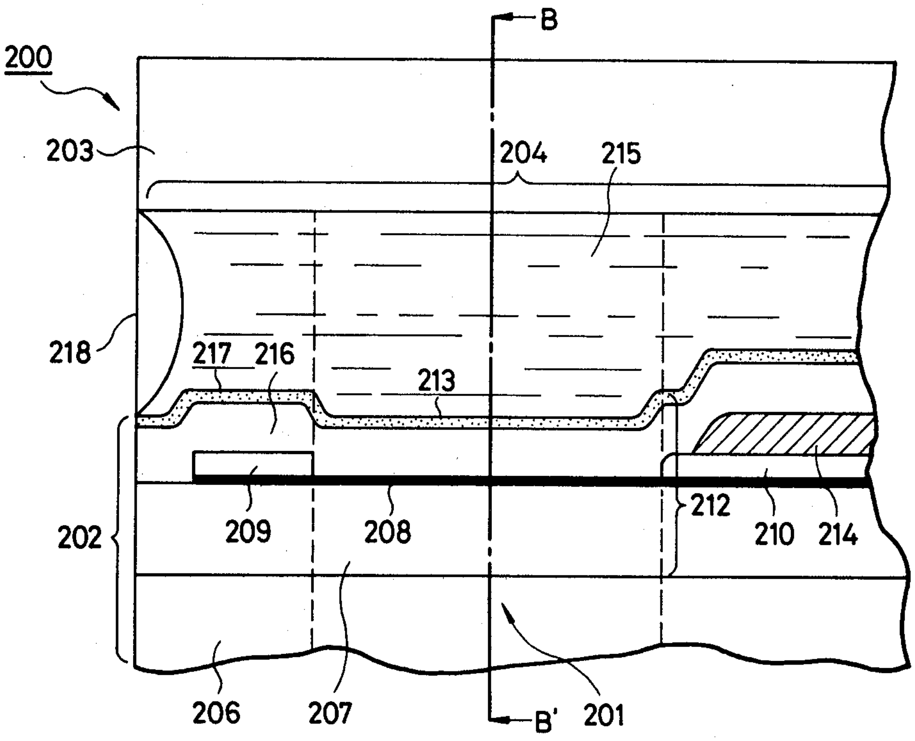

FIG. 2A shows a partial elevational front view of a preferred embodiment of the liquid-jet recording head of this invention for illustrating the principal part of the head. FIG. 2B shows a partial cross sectional view taken on the dot-dash line A—A' of FIG. 2A. FIG. 2A corresponds to FIG. 1A, and FIG. 2B to FIG. 1B.

The liquid-jet recording head 200 shown in FIGS. 2A and 2B comprises principally (1) a base plate 202 for liquid-jet recording utilizing heat for ejecting the liquid (this recording is referred to as thermal ink-jet recording; hereinafter, shortened as T/J), which is provided with a desired number of electro-thermal transducers 201 and (2) a grooved plate 203 having the desired number of grooves corresponding to the electrothermal transducers.

The T/J base plate 202 and the grooved plate 203 are fastened together at a predetermined position with an adhesive or the like so that the position of each electrothermal transducer 201 laid on the T/J plate 202 may correspond with the position of each groove of the grooved plate 203, thereby forming liquid flow paths 204, each of which hence includes a heat action zone 215.

The T/J base plate 202 has a support 206 made of silicone, glass, ceramics or the like, a lower layer 207 made of $SiO_2$ or the like thereupon, a heat-generating resistance layer 208, electrodes 209 and 210 along the liquid flow path 204 and on both side surfaces (downstream and upstream sides) of the heat-generating resistance layer 208, and a protective layer 211 (a first upper layer) made up of an inorganic material. The protective layer covers the portions of the electrodes 209 and 210 and the portions of the heat-generating resistance layer 208 not covered with the electrodes.

The electro-thermal transducer 201 is composed mainly of a heat generating part 212, which is composed of the heat-generating resistance layer 208 and upper layer 211 which are laminated in this order on the support 206. The surface 213 (heat exerting surface) of the upper layer 211 is in contact directly with the liquid filling the corresponding liquid flow path 204.

The main surface of electrode 210 is coated with another protective layer 214 (a second upper layer) made of an organic material. This protective layer 214 is extended to at least the bottom of a common liquid chamber (not shown) positioned upstream of the liquid flow path 204.

In the case of this type of liquid-jet recording head 200 shown in FIGS. 2A–2D, the first upper layer 211 is formed directly on the surface of electrode 209. However, this invention is not limited to this; the surface of the electrode 209, like the surface of the electrode 210, may also provided with an organic material layer similar to the second upper layer 214.

Figure 2C:
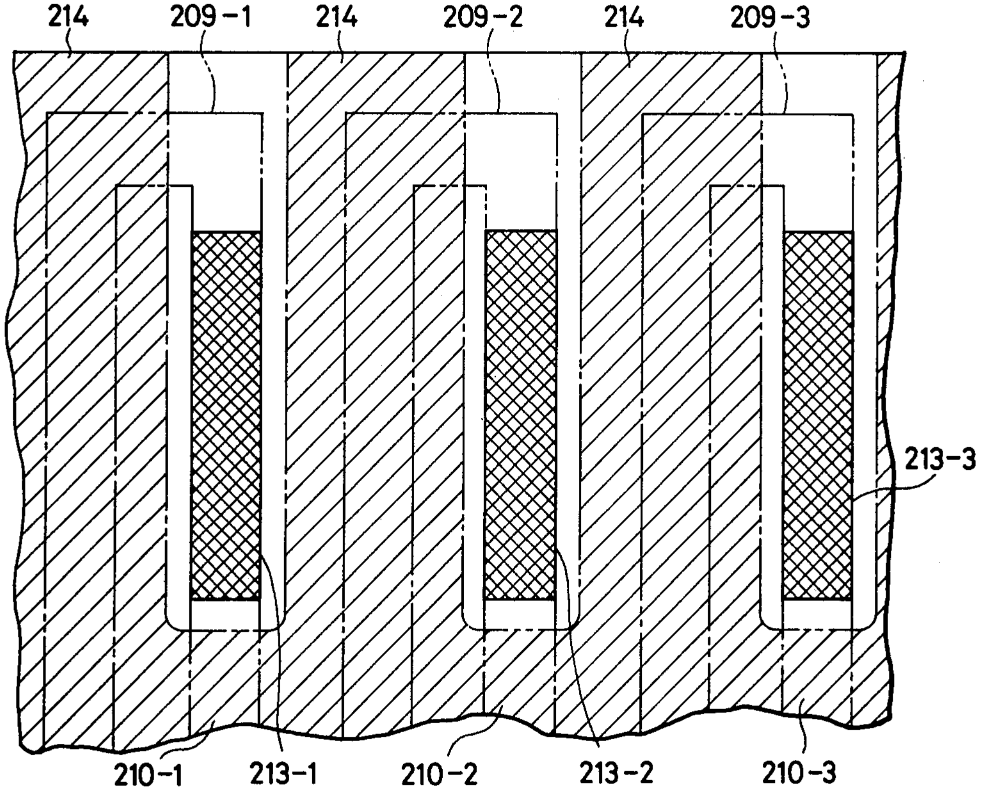

In the liquid-jet recording head of the structure shown in FIGS. 2A–2D, any upper layer corresponding to the second upper layer 214 is not formed in the downstream side of the heat exerting surface 213 in the liquid flow path in the liquid ejecting section as shown in FIG. 2C. As seen from FIG. 2B, the formation of the electrode 209 produces a difference in the level between the position of the surface of the first upper layer 211 on the electrode 209 and the position of the heat exerting surface 213, in the front and rear of the liquid flow path. However, such level difference is not so large in the structure wherein no layer corresponding to the second upper layer 214 is formed on the electrode 9. Therefore, the recording head of the above-mentioned structure is excellent in the stability of the liquid ejection as compared with the head having the structure wherein the second upper layer is provided, besides the first upper layer 211, on the electrode 209. That is to say, in the case of the recording head 200 shown in FIGS. 2A–2D, the bottom surface of each liquid flow path downstream of the heat exerting surface 213 has no remarkable unevenness (level difference) and is relatively smooth so that the liquid can flow smoothly and the formation of liquid droplets is carried out steadily.

When the level difference Δd between the surface position of the heat exerting surface 213 and the surface position of the upper layer 211 positioned on the electrode 209 is substantially negligible as compared with the distance d between the heat exerting surface 213 and the upper surface 215 of the liquid flow path 204, the stability of formation of liquid droplets is not so disturbed. Accordingly, when the Δd is within such a range, a layer like the second upper layer 214 may be formed, besides the first upper layer 211, on the electrode 209.

In the case of the recording head 200 shown in FIGS. 2A–2D, the first upper layer 211 has a two-layer structure consisting of layers 216 and 217, for the purpose of increasing its mechanical strength. The layer 216 is made up of, for example, an inorganic material including an inorganic oxide such as $SiO_2$ or an inorganic nitride such as $Si_3N_4$, which is superior in electric insulating resistance, heat conductivity, and heat resistance, while the layer 217 is composed of, for example, a metallic material having good tenacity, relatively high mechanical strength, and good closely contacting property and adhesion property to the layer 216. The layer 217 is preferably formed of Ta metal when the layer 216 is made of $SiO_2$.

Thus, by making the surface layer of the first upper layer 211 from a relatively tenacious, high strength inorganic material as a certain kind of metal, it becomes possible to absorb sufficiently shocks from the cavitation occurring on the heat exerting surface 213 at the time of ejecting the liquid and thereby extend outstandingly the life of the electro-thermal transducer 201.

However, the layer 217, the surface layer of the upper layer 211, is not always necessary in this invention.

Materials for the first upper layer 211 include, besides the above-cited inorganic materials, transition metal oxides such as titanium oxide, vanadium oxide, niobium oxide, molybdenum oxide, tantalum oxide, tungsten oxide, chromium oxide, zirconium oxide, hafnium oxide, lanthanum oxide, yttrium oxide, and manganese oxide; metal oxides such as aluminum oxide, calcium oxide, strontium oxide, barium oxide, and silicon oxide and also complexes of these compounds; high electric resistance nitrides such as silicon nitride, aluminum nitride, boron nitride, and tantalum nitride; complexes of these oxides with nitrides; and semiconductors such as amorphous silicon and amorphous selenium. Further, thin film materials having low electric resistance in bulk form can also be used for this purpose if they can be made highly resistant by a preparation process such as sputtering, CVD, vacuum deposition, vapor phase reaction, or liquid coating. Thickness of the first upper layer 211 is generally in the range 0.1–5 μm, preferably in the range 0.2–3 μm.

The second upper layer 214 is formed on the principal surface of T/J base plate; that is, the surface which may be brought into contact with the liquid present in the liquid flow path and in the common liquid chamber (cf. FIG. 2C). The primary role of this layer is to prevent the penetration of the liquid and achieve the liquid-resisting function. In particular, the backward extension of this layer to cover the electrode wiring region can prevent the development of a flaw in the electrode wiring or its disconnection during the fabrication process.

The second upper layer 214 is composed of an organic material which can provide a layer having the above-mentioned properties. It is desired to have the following characteristics: (1) good film forming property, (2) compact structure with few pinholes, (3) no solution or swelling caused by inks employed, (4) high insulation resistance after formation into film, and (5) high thermal resistance. Such organic materials are, for example, silicone resin, fluorine-containing resin, aromatic polyamide, addition-polymerized polyimide, polybenzimidazole, metal chelate polymer, titanic acid ester, epoxy resin, phthalate resin, thermosetting phenolic resin, p-vinylphenol resin, Zylok resin (trade name of condensation products of aralkyl ethers with phenols), triazine resin, and BT resin (addition polymerization resin of triazine resin with bismaleimide). Besides these, polyxylene resin or derivatives thereof can be vacuum-deposited to form the second upper layer 214.

Furthermore, the second upper layer 214 can also be formed by plasma polymerization of various organic monomers, for example, thiourea, thioacetamide, vinylferrocene, 1,3,5-trichlorobenzene, chlorobenzene, styrene, ferrocene, pyrroline, naphthalene, pentamethylbenzene, nitrotoluene, acrylonitrile, diphenyl silenide, p-toluidine, p-xylene, N,N-dimethyl-p-toluidine, toluene, aniline, diphenylmercury, hexamethylbenzene, malonitrile, tetracyanoethylene, thiophene, benzene selenol, tetrafluoroethylene, ethylene, N-nitrosodiphenylamine, acetylene, 1,2,4-trichlorobenzene, and propane.

However, when recording heads of high density multi-orifice type are produced, it is desirable that an organic material in which fine photolithographic processing is extremely easy be used for formation of second upper layer 214. Such materials suited for this purpose are, for example, as follows:

(A) POLYIMIDEISOINDROQUINAZOLINE-DION (Trade name: PIQ; Hitachi Kasei Co.)

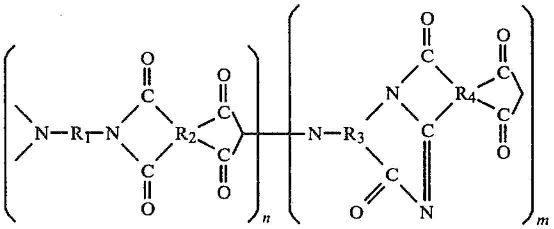

(B) POLYIMIDE RESIN (Trade name: Pyralin: DuPont de Nemours & Co.)

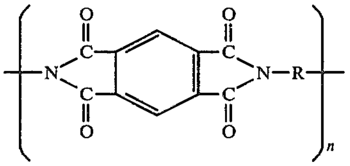

(C) CYCLIZED POLYBUTADIENE (HEAT RESISTANT PHOTORESIST)

(Trade name: JSR-CBR; Japan Synthetic Rubber Co.)

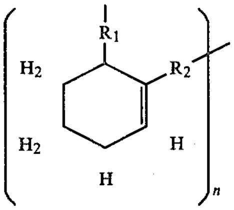

These structural formulae are generally accepted as those of the polymers in cured form.

When the second upper layer 214 is formed by using such an organic material which can be processed easily by micro-photolithography, it is preferable to carry out the anchor coating treatment on the surface on which the second upper layer 214 is formed, for example, the surface of the electrode 210 for the purpose of enhancing the adhesion of the second upper layer 214 to the electrode 210. As the anchor coating material for this purpose, there may be mentioned a commercially available aluminum alcoholate type anchor coating material particularly suitable for the above-mentioned polymer (A) and so-called silane coupling agent.

Among various kinds of silane coupling agents commercially available, the following can be cited as examples of suitable ones (mfd. by Shinetsu Chemical Co.):

KA1003 . . . vinyltrichlorosilane: $CH_2=CHSiCl_3$

KBE1003 . . . vinyltriethoxysilane: $CH_2=CHSi(OC_2H_5)_3$

KBC1003 . . . vinyltris(β-methoxyethoxy)silane: $CH_2=CHSi(OCH_2CH_2OCH_3)_3$

KBM303 . . . β-(3,4-epoxycyclohexyl)ethyltrimethoxysilane

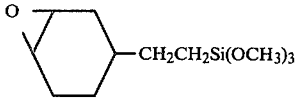

KBM403 . . . γ-glycidoxypropyltrimethoxysilane

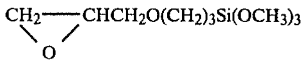

KBM503 . . . γ-methacryloxypropyltrimethoxysilane

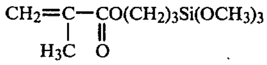

KBM602 . . . n-(dimethoxymethylsilylpropyl)ethylenediamine

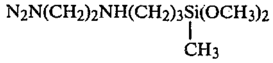

KBM603 . . . n-(trimethoxysilylpropyl)ethylenediamine $H_2N(CH_2)_2NH(CH_2)_3Si(OCH_3)_3$ The lower layer 207 is formed mainly as a layer for controlling the flow of heat from the heat generating part 212 toward the support 206. The material and thickness of this layer 207 are suitably selected and designed so as to control the flow of heat as follows: when thermal energy is applied to the liquid at the heat action zone 215, a larger quantity of the heat generated from the heat generating part 212 is allowed to flow to the side of the heat action zone 215; when the electric conduction to the electro-thermal transducer 201 is turned off, the heat remaining in the heat generating part 212 is allowed to flow quickly toward the support 206. Materials for constructing the lower layer 207 include, besides $SiO_2$ as mentioned above, inorganic materials represented by metal oxides such as zinconium oxide, tantalum oxide, magnesium oxide, and aluminum oxide.

For formation of the heat-generating resistance layer 208, most materials are acceptable that can generate heat as desired by allowing an electric current to flow therethrough.

Such materials used include, for example, tantalum nitride, nichrome, silver-palladium alloy, silicon semiconductor, and borides of metals such as hafnium, lanthanum, zirconium, titanium, tantalum, tungsten, molybdenum, niobium, chromium, and vanadium. Of these materials, metal borides can be exemplified as excellent materials, among which hafnium boride is the most excellent in the properties, and then zirconium boride, lanthanum boride, tantalum boride, vanadium boride and niobium boride are excellent in that order.

The heat-generating resistance layer 208 can be formed from the above-cited materials by applying a technique such as electron beam vacuum deposition or sputtering.

Thickness of the heat-generating resistance layer is determined so as to give a desired quantity of heat generated for unit time according to its surface area and material quality, shape and size of the heat action zone, power consumption, etc. Generally speaking, however, the thickness is in the range of 0.001–5 μm, preferably in the range of 0.01–1 μm.

For formation of the electrodes 209 and 210, various electrode materials generally used, for example, metals such as Al, Ag, Au, Pt, and Cu, are suited. Using such a material, the electrodes of predetermined size, shape and thickness are formed at predetermined positions by a technique of vacuum deposition or the like.

For formation of the grooved plate 203 and the members constituting the common liquid chamber positioned upstream of the heat action zone 215, most materials are effectively used provided that they meet the following requirements: The material is not affected or hardly affected in the shape by heat under environmental conditions during fabrication of the recording head and its use; fine, precise fabrication processing can be easily applied to the material with a desired precision for surface; and the material can be processed so that the liquid may flow smoothly in the liquid flow path formed with the grooved plate and the members for the common liquid chamber constructed with the material.

Representative materials suited for this purpose are ceramic, glass, metal, plastic, silicon wafer, etc. In particular, glass and silicon wafer are suited because of their easy processability and proper heat resistance, thermal expansion coefficient, and heat conductivity. The outer surface around the orifice 218 is preferably finished with a water repellent treatment when the liquid used is of aqueous type or with an oil repellent treatment when the liquid is of nonaqueous type, for the purpose of preventing the surface from being wetted with the liquid and also preventing the liquid from running out toward the outside of the orifice.

Figure 2D:
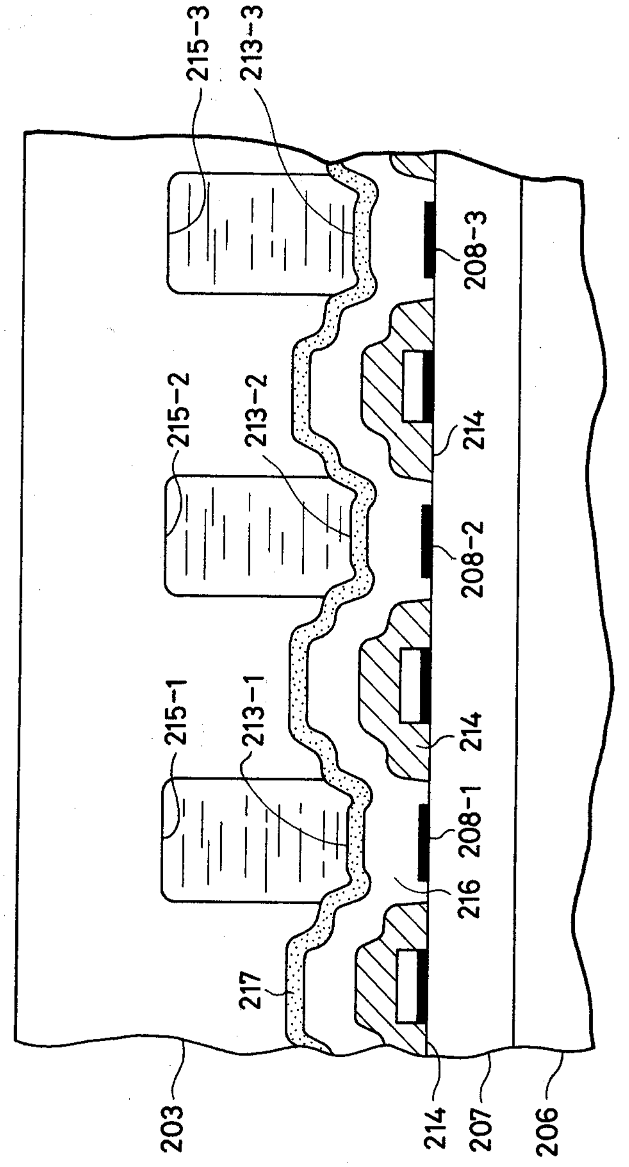

FIG. 2D is a partial cross sectional view taken on the dot-dash line B—B′ of FIG. 2B.

In the liquid-jet recording head 200, as shown in FIG. 2C, the second upper layer 214 is not formed in the region of the liquid flow path 204 downstream of the heat exerting surface 213, but it is formed in the downstream region other than the liquid flow path 204. In a modification example, the second upper layer 214 may be removed from the entire region downstream of the heat exerting surface 213. However, in a more preferable example, the second upper layer 214 may cover the region of the electrode which is positioned downstream of the heat exerting surface 213 and does not include the liquid flow path 204.

Figure 3:
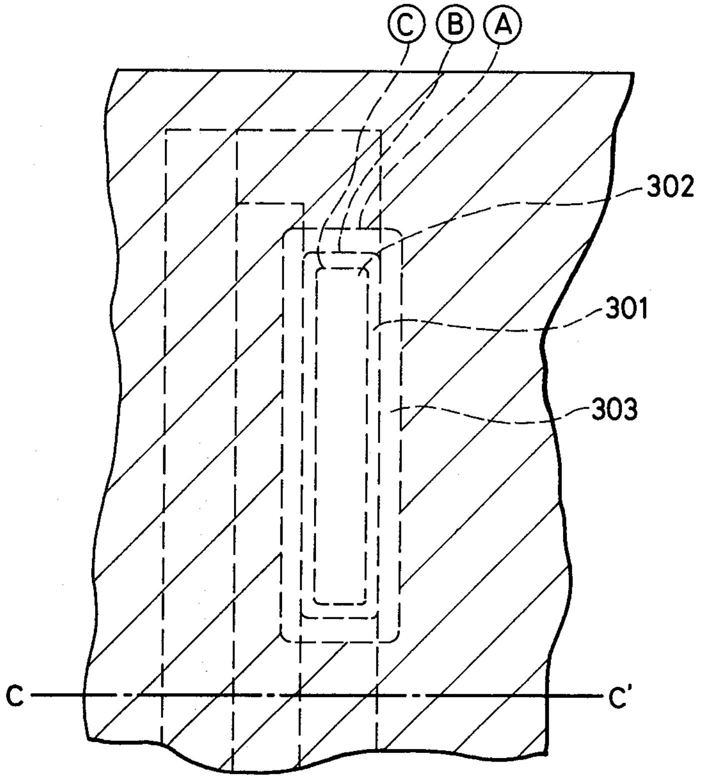
FIG. 3 is a partial plane view of the principal part of another recording head of this invention.

FIG. 3 shows a partial plane view of a recording head of this invention wherein the entire region other than the heat exerting surface is covered with the second upper layer. The region bounded by border Ⓑ is the actual heat exerting surface 301. In this invention, the second upper layer may be formed on all the region except the heat exerting surface 301 in the border Ⓑ, or it may be formed on all the region except a region 303 wider than the surface 301 as shown by the border Ⓐ, or it may also be formed on all the region except a region 302 narrower than the surface 301 as shown by the border Ⓒ.

This invention will be illustrated in more detail with reference to the following example:

EXAMPLE

A piece of Si wafer was thermally oxidized for use as the base plate, to form a $SiO_2$ film of 5 μm thickness on the surface. On this base plate, a $HfB_2$ layer of 1500 Å thickness was formed as the heat-generating resistance layer by the sputtering method. On this layer, a Ti layer of 50 Å thickness and an Al layer of 5000 Å thickness were laid successively by the electron beam vacuum deposition method. A pattern as shown in FIG. 2C was formed on the coated plate by photolithography. The size of the heat exerting surface is 30 μm in width and 150 μm in length and the resistance was 150 ohms including the resistance of the Al electrodes.

Then, a PIQ layer (the second upper layer) of 2.0 μm thickness was formed in the following way, and the portion of the PIQ layer around the heat exerting surface was removed so that the PIQ layer in the region hatched in FIG. 2C might remain. The shape of the removed portion is as shown in FIG. 2C and the size thereof is 50 μm×250 μm.

The formation of the PIQ layer will be described.

The support on which the heat-generating resistance layer and electrodes were formed in the predetermined pattern was washed, dried, and coated with a PIQ solution by using a spinner (spinner rotating conditions: 500 rpm, 10 sec for the 1st step; 4000 rpm, 40 sec for the 2nd step). The coated support was dried at 80° C. for 10 minutes and baked then at 220° C. for 60 minutes.

A photoresist composition OMR-83 (mfd. by Tokyo Oyokagaku Co.) was coated thereon with a spinner, dried, exposed using a mask, and developed to give a desired pattern to PIQ layer.

The PIQ layer was etched at room temperature by using an etchant for the PIQ. After rinsing with water and drying, the photoresist was removed by using a removing liquid for OMR. The support was then baked at 350° C. for 60 minutes, thereby completing pattern formation of the PIQ layer.

The PIQ layer had a thickness of 200μ in its portion formed on the support in which the heat-generating resistance layer or the electrode is not present and a thickness of 1.8 μm in its portion formed on the heat-generating resistance layer and the electrode. This indicates that the PIQ is good in the "step coverage property."

Succeedingly, a $SiO_2$ layer of 2.2 μm thickness was deposited on the coated support by the high rate sputtering, and further a Ta layer of 0.5 μm thickness was deposited by the sputtering.

Onto the T/J base plate thus prepared, a grooved glass plate (groove size: 50 μmH×50 μmW×2 mmL) was was bonded to complete a recording head. That is, as shown in FIG. 2B, a grooved glass plate for constituting an ink flow channel and heat action zone was bonded to the T/J base plate.

Rectangular voltage pulses of 10 μS and 30 V were applied to the electric-thermal transducer of the recording head thus prepared at a frequency of 800 Hz. The liquid was ejected in response to the input signals. At that time, the formation of flying droplets was stable.

When such droplet formation is repeated for a long period, a recording head having some production fault becomes unable to eject ink on account of disconnection caused by galvanic corrosion of the Al electrode, dielectric breakdown between the Ta protective layer and Al electrode, or the like. The repetition number of droplet formation until that time is referred to as duration number of times.

Table 1 shows comparison results with respect to the duration number of times among (a) the recording head of this example, (b) a recording head prepared by removing the PIQ layer from (a), and (c) a recording head having the PIQ layer only at the bottom portion of the common liquid chamber (number of samples: 1000 for each case).

TABLE 1

| Sample | Duration number of times | | |
|---|---|---|---|
| | $10^7$ or less | $10^7$–$10^9$ | $10^9$ or more |
| (a) | 0% | 0.2% | 99.8% |
| (b) | 75% | 24% | 1% |
| (c) | 15% | 22% | 63% |

As is evident from Table 1, the head of this invention constantly achieves a duration number of $10^9$ or more and is therefore suitable for use as a multi-orifice head.

In the (b) type of head, the deterioration in durability was caused remarkable by the galvanic corrosion of Al electrodes on account of the penetration of recording liquid through pinholes in $SiO_2$ sputtered layer and Ta sputtered layer and by the dielectric breakdown between Al electrodes and Ta layer.

In the (c) type of head, galvanic corrosion was observed frequently in regions other than the common liquid chamber so that the reliability of the head was deteriorated. Slight galvanic corrosion was also found in the region of the PIQ layer coated on the bottom surface of the common liquid chamber. This is conceivably due to a flaw in the PIQ layer which has been produced during the processing stages, for instance, during the operation of bonding the grooved glass plate.

In the head of this invention, the strength of which is increased by laminating a layer of inorganic material on a layer of organic resin which can be finely worked with high precision, any flaw is not produced during the processing stages. This increases the reliability of the head. That is to say, the covering of lead electrodes other than the heat action portion with double layers, organic layer and inorganic layer, improves the reliability of the head to a great extent. This is particularly remarkable when a protective layer, such as a Ta layer, having a high electric conductivity is used as the upper layer, and in this structure there is no deterioration in the durability caused by dielectric breakdown between the Al lead electrode and the Ta protective layer of high conductivity.

What we claim is:

1. A liquid-jet recording head provided with a liquid ejecting section comprising a liquid flow path communicating with an orifice of said liquid ejection section for ejecting a liquid to form flying droplets and having as a portion thereof a heat action zone where thermal energy for forming said droplets acts on the liquid and with an electro-thermal transducer comprising at least one pair of opposing electrodes electrically connecting to a heat-generating resistance layer formed on a base plate and a heat generating part formed between the electrodes, characterized by said electro-thermal transducer having a protective layer composed of a first layer of an organic material and a second layer of an inorganic material which are laminated on the portion of the electrode under the liquid flow path in that order from the electrode.

2. A liquid-jet recording head material to claim 1, having a plurality of the liquid flow paths.

3. A liquid-jet recording head according to claim 1, wherein the organic material is a resin.

4. A liquid-jet recording head according to claim 1, wherein the organic material can be processed by micro-photolithography.

5. A liquid-jet recording head according to claim 1, wherein the first layer is a cured polyimide indroquinazoline-dion layer.

6. A liquid-jet recording head according to claim 1, wherein the first layer is a cured polyimide resin layer.

7. A liquid-jet recording head according to claim 1, wherein the first layer is a cured cyclized polybutadiene layer.

* * * * *

UNITED STATES PATENT AND TRADEMARK OFFICE

CERTIFICATE OF CORRECTION

PATENT NO. : 4,450,457

DATED : May 22, 1984

INVENTOR(S) : TAKESHI MIYACHI, ET AL.

It is certified that error appears in the above-identified patent and that said Letters Patent is hereby corrected as shown below:

Column 1, line 20, change "Offen" to --Offenlegungsschrift--;

line 47, after "it" insert a comma.

Column 5, line 1, after "also" insert --be--;

line 13, after "such" insert --a--.

Column 6, line 47, change "polyxylene" to --Polyxylylene--.

Column 7, line 41, change "H" to --$H_2$--.

Column 8, line 46, change "zin" to --zir--.

Column 10, line 29, change "to" to --of--;

line 49, delete "was".

UNITED STATES PATENT AND TRADEMARK OFFICE

CERTIFICATE OF CORRECTION

PATENT NO. : 4,450,457

DATED : May 22, 1984

INVENTOR(S) : TAKESHI MIYACHI, ET AL.

It is certified that error appears in the above-identified patent and that said Letters Patent is hereby corrected as shown below:

Column 12, line 24, change "material" to --according--.

Signed and Sealed this

*Sixteenth* Day of *October 1984*

[SEAL]

*Attest:*

GERALD J. MOSSINGHOFF

*Attesting Officer* *Commissioner of Patents and Trademarks*